United States Patent Office 3,047,551
Patented July 31, 1962

3,047,551
CONTINUOUS POLYMERIZATION OF OLEFINS USING A FIXED BED, SUPPORTED TRANSITION METAL-ORGANOMETALLIC CATALYST
Charles L. Thomas, Swarthmore, Pa., assignor to Sun Oil Company, Philadelphia, Pa., a corporation of New Jersey
No Drawing. Filed Jan. 20, 1960, Ser. No. 3,482
4 Claims. (Cl. 260—88.2)

This invention relates to a method for polymerizing olefins, and is more particularly directed to a process wherein a supported polymerization catalyst is formed in situ, and polymerization of alpha-olefins to a hydrocarbon-soluble polymer is thereafter continuously carried out in the presence of the so-formed catalyst.

It is known in the art to polymerize alpha-olefins in the presence of a coordination complex catalyst, such as the reaction product of a halide of a metal of groups IVb, Vb, or VIb of the periodic system with a metal alkyl or hydride. Particularly useful catalysts for the polymerization of alpha-olefins are the halides of titanium or vanadium, activated by an aluminum alkyl or an aluminum alkyl halide. Examples of such catalysts are titanium trichloride-aluminum triethyl; titanium tetrachloride-aluminum ethyl dichloride-aluminum triethyl; vanadium trichloride-aluminum triisobutyl; vanadium oxychloride-aluminum diethyl chloride, and other combinations of metal halides and aluminum alkyls. Such polymerization catalysts are well known to the art, and are described in many publications, for example in Linear and Stereoregular Addition Polymers, by Gaylord and Mark, Interscience Publishers, 1959. Since the catalysts are sensitive to oxygen and moisture, they must be prepared in an oxygen- and moisture-free atmosphere, and the polymerization must also be carried out under anhydrous and oxygen-free conditions. Ordinarily the reaction will be carried out in the presence of an inert liquid hydrocarbon in which the monomer to be polymerized is dissolved. The polymerization is carried out at temperatures between 25° C. and 120° C., since at lower temperatures the reaction is uneconomically slow, and at higher temperatures the molecular weight of the product is undesirably low. When the term "polymerization temperature" is hereinafter used, it will denote the range of 25° C. to 120° C.

Monomers useful in the practice of the present invention are those which have the formula $CH_2=CHR$, where R is an alkyl or cycloalkyl radical of from 1 to 10 carbon atoms or hydrogen, and can be polymerized or copolymeried to form a normally solid polymer which is soluble in the reaction medium at the temperature of polymerization. Thus ethylene and propylene alone are not suitable for use in my process, since these monomers form polymers which are insoluble in the reaction medium at polymerization temperatures. Other monomers which form at least partially insoluble polymers include 3-methylbutene-1, 4-methylpentene-1, 5-methylhexene-1, 3-methylhexene-1, 3-ethylhexene-1, 3,5,5-trimethylhexene-1, 5,5-dimethylhexene-1, 4,4-dimethylpentene-1, and 4-methylhexene-1.

There are a number of monomers, however, which form homopolymers which are wholly soluble in the reaction medium at polymerization temperatures, and it is to the polymerization of these monomers that the present invention is directed. Included in the monomers which form soluble polymers are butene-1, pentene-1, hexene-1, heptene-1, octene-1, allyl cyclohexane, 3-ethylheptene-1, 3,7-dimethyl-octene-1, and 4,6,6-trimethylheptene-1. In addition, ethylene may be copolymerized with propylene and/or butene-1, and/or with diolefins such as butadiene and isoprene, to yield soluble copolymers, and such copolymers may be produced in accordance with the present invention.

Polymerization of monomers which yield soluble polymers with the aid of a coordination complex catalyst is, of course, known to the art. In the prior art processes the catalyst components are brought together in the polymerization reaction medium either in the presence or absence of the olefin to be polymerized, followed by continuous addition of the monomer to the reactor for a time sufficient to permit the formation of a substantial amount of soluble polymer, yet insufficient to raise the viscosity of the reaction medium to a degree such that it is difficult to transfer from the reactor. At this time methanol or another polar material such as acetone is added to destroy the catalyst and to dissolve the catalyst components, whereby to reduce inorganic contamination of the polymer. This procedure necessarily destroys both the metal halide and the metal alkyl, and neither can be recovered for continued use in the process. Such a process also has the disadvantage of being essentially a batch operation.

It has also been proposed to conduct the polymerization in a continuous manner by continuously feeding solvent, monomer, and catalyst to a reactor and continuously withdrawing reaction products, including both catalyst components, from the reactor. Withdrawal of the metal halide component of the catalyst is necessary since it is so finely divided that it cannot be held back in the reactor by any practical means. In this case also, the catalyst must be deactivated prior to further processing of the polymer, causing loss of both catalyst components.

It is an object of this invention to provide a continuous process for the polymerization of alpha-olefins, or mixtures thereof, to polymers soluble in the reaction mixture at polymerization temperatures wherein the metal halide component of the catalyst is retained within the reactor, so that only the metal alkyl component of the catalyst is recovered with the reaction products. When the reaction mixture is contacted with methanol in order to remove catalyst residues from the polymer the metal alkyl will, of course, be destroyed, but loss of the metal halide component of the catalyst, inherent in the prior art processes, may be avoided, and this component will remain available for further polymerization.

This object is attained by continuously passing a feed mixture comprising an inert hydrocarbon solvent, the monomer or mixture of monomers to be polymerized, and a metal alkyl, alkyl halide or hydride through a bed of a supported subhalide of a metal of groups IVb, Vb or VIb of the periodic system under polymerization conditions of temperature and pressure. The supported subhalide catalyst component may be prepared as disclosed in my copending application Serial No. 612,103, filed September 26, 1956, of which this application is a continuation-in-part. Application S.N. 612,103 discloses a method for the polymerization of alpha-olefins generally in the presence of an aluminum alkyl and a supported titanium or zirconium trichloride catalyst, and gives an example of a batch polymerization using this catalyst. It has now been found, however, that whereas batch polymerizations as described give excellent results, if it is attempted to use the catalyst in a continuous process, additional aluminum alkyl must be included in the feed to the process in order to maintain the activity of the catalyst since, contrary to what might be expected, the aluminum alkyl-metal halide coordination complex appears to be somewhat unstable, and the solvent, if free of metal alkyl, will leach the alkyl off the surface of the halide, whereby to destroy the activity of the catalyst. If, however, the feed contains from about 0.01% to 0.1%, or more, of metal alkyl, the activity of the catalyst is maintained.

The solid component of the catalyst may be prepared by impregnating the supporting material, which may be any adsorptive solid such as alumina, silica-alumina, kieselguhr, and the like, which has previously been calcined to remove water therefrom, with a solution, in an inert hydrocarbon solvent, of a hydrocarbon-soluble halide of a metal of groups IV$b$, V$b$, and VI$b$ of the periodic table, such as titanium tetrachloride, vanadium tetrachloride, vanadium oxytrichloride, or tungsten hexachloride, in the absence of air or moisture. The halide is then reduced to a lower valence state, insoluble in hydrocarbons, by any convenient means, such as by treatment with hydrogen at elevated temperatures and pressures, or by reaction with a solution of a reducing agent such as a metal alkyl or hydride. In order to minimize difficulties involved in transferring the supported halide component of the catalyst from one place to another, it is preferred to carry out the steps of impregnation and reduction in the reactor in which the polymerization is to take place. Preferably the concentration of the chloride solution is such as to deposit from about 0.5% to 10% by weight, based on the support, of the metal chloride on the support. Alternatively, the supported catalyst may be prepared by contacting the adsorbent material with the metal halide in its highest valence state at a temperature above the melting point of the latter, draining excess liquid halide from the adsorbent, and reducing adsorbed metal halide to a lower valence state. Examples of metal halides which may be deposited on the adsorbent in this manner include titanium tetrabromide, titanium tetrachloride, titanium tetrafluoride, vanadium tetrachloride, vanadium oxytrichloride, tungsten hexachloride, tungsten hexabromide, and titanium tetraiodide. In another embodiment of my invention the metal chloride may be vaporized, and the vapors passed upwardly through the adsorbent until vapors are detected above the bed of adsorbent. The metal halide retained by the adsorbent material is then reduced to a lower valence state as described above. Metal halides which may be deposited on the catalyst in this manner include, in addition to those mentioned above, zirconium tetrachloride and zirconium tetrabromide.

After the supported reduced metal halide catalyst component has been formed in the reactor, a solution of the olefin to be polymerized and an aluminum alkyl or alkyl halide in an inert hydrocarbon solvent such as hexane, octane, or decahydronaphthalene is continuously fed into one end of the reactor, while a solution comprising polymer, unreacted olefin, and the organo-aluminum compound is continuously removed therefrom. The concentration of the organo-aluminum compound in the solution should be in the range of from 0.01% to 1% by weight, preferably from 0.05% to 0.10%. The concentration of olefin in the feed may be in the range of 5% to 50% by volume, preferably in the vicinity of 10 to 25%. The space rate, that is, the volume of feed per volume of reactor space per hour, will vary widely with the particular olefin or olefin mixture to be polymerized, since some olefins are more reactive than others; but is generally in the range of 0.05 to 0.5. The reactor effluent is continuously collected and is mixed with methanol or acetone in order to deactivate the aluminum alkyl and to precipitate the polymer, which may then be recovered from the solvent by filtration.

In order that those skilled in the art may more fully understand the nature of my invention, the following examples are given.

EXAMPLE I

A one-and-one-quarter gallon reactor fitted with an inlet line and outlet line, each line having valve means for controlling the flow through the line and for maintaining pressure within the reactor, is charged with 4400 cc. of gamma alumina particles of 3–8 mesh size, and flushed with nitrogen to remove oxygen from the reactor. A solution of titanium tetrachloride in isooctane sufficient to cover the gamma alumina is then added, the solution containing 33 grams of titanium tetrachloride. After allowing the alumina to soak in the solution for about ½ hour, 25 grams of aluminum triethyl are added to reduce the titanium tetrachloride to the trivalent state and to deposit solid titanium trichloride in the pores of the alumina.

The contents of the reactor are then aged for 2 hours at 120° C., following which the reactor is cooled to 80° C. and a feed stock consisting of 25% butene-1 and 75% isooctane plus two grams of aluminum triethyl per gallon is continuously passed to the reactor at a space rate of 0.5, while withdrawing reaction products at an approximately equal rate. Polymerization is carried out in this manner over a period of 16 hours, while continuously treating the reactor effluent with methanol in order to deactivate the aluminum alkyl and to precipitate polymer. It is observed that polymerization of butene-1 to polybutene-1 remains constant at about 80% conversion of the feed olefin to polymer over the entire period of the run, indicating that the supported titanium catalyst was in no way deactivated.

EXAMPLE II

The supported catalyst is prepared in the same manner as in Example I, except that $VOCl_3$ is substituted for $TiCl_4$. After the aging period, however, the liquid in the reactor is drained off, and the reactor is filled with a mixture consisting of 80 mol percent isooctane, 1 mol percent of ethylene, and 19 mol percent propylene. Thereafter a feed mixture consisting of 77 mol percent isooctane, 11.5 mol percent ethylene and 11.5 mol percent propylene and containing 2.5 grams of aluminum triisobutyl per gallon is continuously fed to the reactor at an average space rate of about 0.4. Temperature is maintained at 70 to 73° C., and the pressure at 80 to 85 p.s.i.g. As may be seen from the following table, polymerization of the olefines to a rubbery copolymer containing about 60% ethylene and 40% propylene takes place at a reasonably constant rate over the entire period of a 15-hour run.

*Table I*

| Time (Hours) | Feed in (Gal./Hr.) | Effluent (Gal./Hr.) | Copolymer (Lbs./Gal.) |
|---|---|---|---|
| 2.0 | 0.40 | 0.25 | 0.18 |
| 2.8 | 0.54 | 0.54 | 0.25 |
| 4.3 | 0.30 | 0.33 | 0.29 |
| 5.8 | 0.33 | 0.32 | 0.31 |
| 7.3 | 0.49 | 0.32 | 0.34 |
| 8.3 | 0.83 | 0.62 | 0.34 |
| 8.8 | 0.60 | 0.57 | 0.31 |
| 9.8 | 0.50 | 0.50 | 0.32 |
| 10.3 | 0.91 | 0.98 | 0.33 |
| 11.0 | 0.81 | 0.69 | 0.24 |
| 11.7 | 0.68 | 0.67 | 0.31 |
| 12.5 | 0.50 | 0.61 | 0.28 |
| 14.2 | 0.12 | 0.29 | 0.31 |
| 15.3 | 0.01 | 0.19 | 0.27 |

As may be observed from Table I, the activity of the catalyst at the end of the run is in no way lessened, so that it can be reused for a subsequent polymerization reaction.

EXAMPLE III

The procedure of Example II is followed, substituting $VCl_4$ for $VOCl_3$. Essentially the same results are obtained, except that the ethylene content of the copolymer is somewhat higher.

EXAMPLE IV

The procedure of Example I is followed, substituting zirconium tetrachloride for titanium tetrachloride. Essentially the same results are obtained.

EXAMPLE V

The procedure of Example I is followed, substituting tungsten hexachloride for titanium tetrachloride and substituting aluminum diethyl chloride for aluminum triethyl. Solid, crystalline polybutene-1 is obtained in approximately 60% yield.

EXAMPLE VI

A reactor is filled with 3–8 mesh particles of silica gel, previously calcined, and is flushed with nitrogen to remove oxygen. The reactor is then heated to 325° C., and vaporized zirconium tetrachloride, carried in a stream of nitrogen, is passed through the reactor until the adsorptive capacity of the silica gel is exhausted, as evidenced by the appearance of fumes at the reactor exit. Hydrogen is then passed through the reactor, while maintaining the temperature at 325° C., until reduction of the chloride to a lower valence state is complete, as evidenced by the disappearance of HCl in the reactor effluent. The reactor is then cooled to 95° C. and a feed stock consisting of 33% 3-ethylheptene-1 and 67% heptane, and containing two grams of aluminum diethyl chloride per gallon is passed through the reactor at a space rate of 0.1 for 22 hours while collecting reactor effluent comprising heptane, unreacted 3-ethylheptene-1, and aluminum diethyl chloride. The reactor effluent is treated with isopropyl alcohol to decompose the aluminum triisobutyl and to precipitate solid poly(3-ethylheptene-1). Conversion of the monomer to the polymer is constant at about 25% over the entire period of the run.

While in the foregoing examples the activity of the metal halide catalyst remained steady, if the reaction is continued over long periods of time, some loss of activity is noted, due to erosion of the metal halide from the surface of the support. In such a case, activity may be restored by re-impregnating the support with a small additional amount of metal halide in its highest valence state, followed by reduction to a lower valence state.

The invention claimed is:

1. A process for polymerizing olefins which comprises continuously passing a first stream consisting essentially of an inert hydrocarbon solvent, alpha-olefinic material capable of forming normally solid polymer soluble in the solvent at the temperature of polymerization, and an organo-aluminum compound, at a temperature of from 25° C. to 120° C. through a reaction zone containing catalytic material which consists essentially of a mass of finely divided adsorptive solid material carrying on its surface a catalytic material selected from the group consisting of halides and oxyhalides of titanium, zirconium, vanadium, and tungsten, which halides and oxyhalides are in a valence state lower than the maximum, continuously polymerizing the olefinic material in contact with the catalytic material, separating a second stream containing dissolved olefin polymer from the fixed bed of catalytic material while retaining the solid material in the reaction zone, and recovering solid polymer from the second stream.

2. The process according to claim 1 wherein the olefinic material is a mixture of ethylene and propylene.

3. The process according to claim 1 wherein the olefinic material is butene-1.

4. The process according to claim 1 wherein the olefinic material is 3-ethylheptene-1.

References Cited in the file of this patent

UNITED STATES PATENTS

| | | |
|---|---|---|
| 2,909,512 | Bruce et al. | Oct. 20, 1959 |
| 2,918,457 | Jezl | Dec. 22, 1959 |
| 2,943,063 | Eby et al. | June 28, 1960 |
| 2,981,725 | Luft et al. | Apr. 25, 1961 |

FOREIGN PATENTS

| | | |
|---|---|---|
| 549,466 | Belgium | July 11, 1956 |

OTHER REFERENCES

"Linear and Stereoregular Addition Polymers," by Gaylord and Mark, Interscience Publishers Inc., New York, 1959, pages 157–158 pertinent.